United States Patent
Laieski

(12) 
(10) Patent No.: US 6,734,800 B1
(45) Date of Patent: May 11, 2004

(54) ATMOSPHERIC LOW PRESSURE ALARM SYSTEM

(75) Inventor: Ronald C Laieski, Floral Park, NY (US)

(73) Assignee: Ronald C. Laieski, Floral Park, NY (US)

( * ) Notice: Subject to any disclaimer, the term of this patent is extended or adjusted under 35 U.S.C. 154(b) by 0 days.

(21) Appl. No.: 08/938,597

(22) Filed: Sep. 25, 1997

(51) Int. Cl.[7] .................................................. G01W 1/00
(52) U.S. Cl. ..................... 340/601; 340/693.6; 116/291; 73/387; 73/709
(58) Field of Search ............................... 340/601, 602, 340/691, 693, 688, 614, 693.5, 693.6; 73/384, 386, 732, 387, 700, 740, 709; 116/296, 297, 298, 300, 306, 291, 290; 361/600

(56) References Cited

U.S. PATENT DOCUMENTS

| 3,623,051 A | * | 11/1971 | Juno ........................... 340/601 |
| 3,654,808 A | * | 4/1972 | Fukumoto ..................... 73/384 |
| 3,656,138 A | * | 4/1972 | Hamma ........................ 177/48 |
| 3,748,642 A | * | 7/1973 | Radin et al. ................. 340/688 |
| 3,888,121 A | * | 6/1975 | Geldmacher ................ 374/188 |
| 3,952,692 A | * | 4/1976 | Griggs ........................ 116/102 |
| 4,016,536 A | * | 4/1977 | La Chapelle ............... 340/688 |
| 4,233,750 A | * | 11/1980 | Cheng ......................... 337/374 |
| 4,396,301 A | * | 8/1983 | Stucki ......................... 374/188 |
| 5,357,242 A | * | 10/1994 | Morgano et al. ............ 340/626 |
| 5,554,970 A | * | 9/1996 | Mottahedeh ................ 340/441 |

* cited by examiner

Primary Examiner—Benjamin C. Lee

(57) ABSTRACT

A device used to alert an individual of the presense of low atmospheric pressure. This is accomplished through the use of an aeronoid barometer, and an audio/visual alarm. The counterclockwise rotation of the metallic barometer needle contacts the the sensor probe, or metallic contact, at a given low atmospheric pressure. This contact completes an electrical circuit which activates an alarm.

2 Claims, 1 Drawing Sheet

ATMOSPHERIC LOW PRESSURE ALARM SYSTEM

BRIEF SUMMARY OF THE INVENTION

The product being considered, as conceived by Mr. Ronald Laieski, is "The Atmospheric Low Pressure Alarm System." This product concept calls for the manufacture of a device which would enable the private citizen to detect the presense of low atmosphere that would signal the presense of the possible approach of severe weather associated with hurricanes, tornados, and the like. The system would consist of a barometric pressure measurement device connected to a central housing equipped with both an audio and visual alarm mechanism. The device would function with both AC and battery power with a switch provided on the face of the control panel to alternate from one power source to the other. In this manner, the alarm would continue to function even if the power was lost. The visual alarm system also serves as an aide to alert the hearing impaired.

BRIEF DESCRIPTION OF THE SEVERAL VIEWS OF THE DRAWING

The referenced drawing (enclosed), is a perspective view of the "Atmospheric Low Pressure Alarm System." The referenced drawing describes the components required to produce an audio/visual alarm signal. These items include an aeronoid barometer, alarm, light emitting diode, or LED, sensor probes, and a power switch.

DETAILED DESCRIPTION OF THE INVENTION

Figure 1:
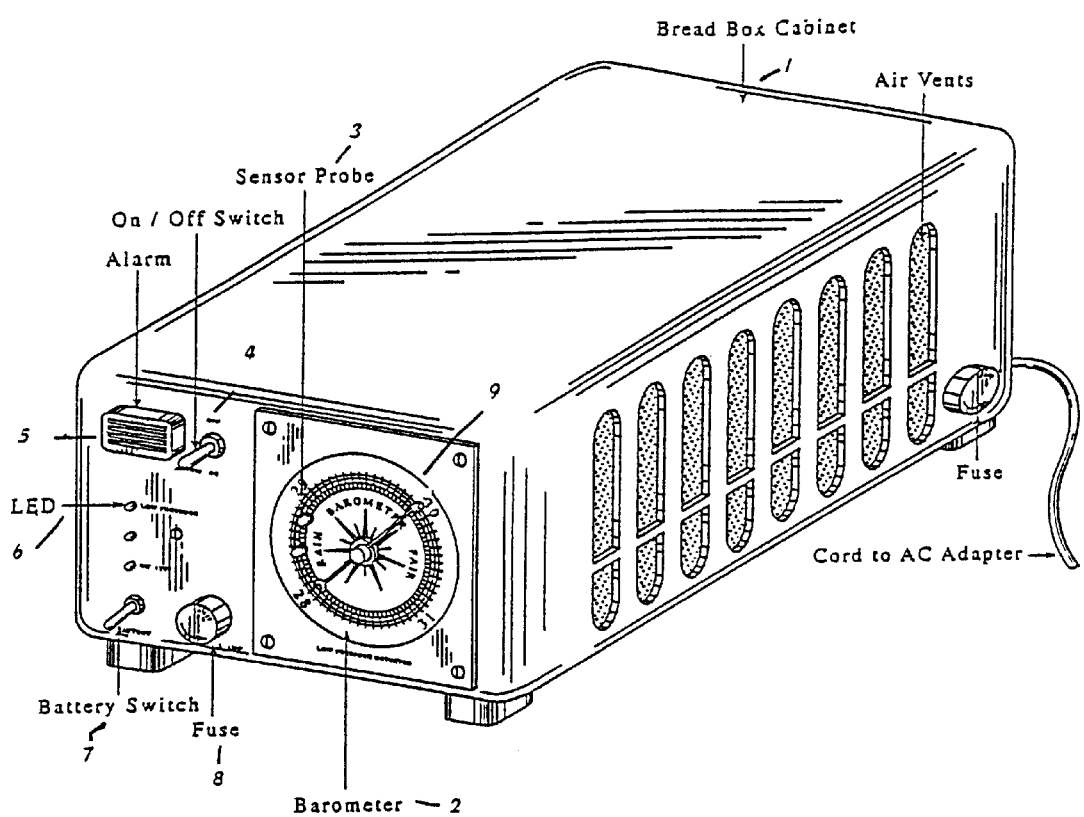

Referring to the drawing, discloses a device which was made from ordinary commercial components, and materials. The item may be assembled using simple hand tools such as a hand drill, screwdriver, and wrench. The item can be wired using a soldering gun, solder, and wire. The item can be placed in a home, boat, or other dry area. For example, the user can simply place the alarm on the shelf, turn on the power, and simply wait for the audio/visual alarm signal. The user's installation would be similar to that of a smoke detector. This product distinguishes itself as an enhancement to the conventional barometer. While many homes have barometers in place, such devices do not provide for an alarm when the air pressure drops below a given level. Furthermore, this device brings forth the conception of a device which could detect, and alert an individual of an approaching low pressure weather system. The specific improvement is to complete the electrical circuit to the alarm. This is accomplished when the metallic barometer needle contacts the metallic sensor probe, or contact. It is simply an electrical switch. The user can activate the unit by toggling the power switch to the down position. (Battery operation). The operator may also switch to AC power by toggling the power switch (shown) to the "up" position. The AC adapter must be connected to the wall socket for this mode of operation. The fuse (see front panel) is used as an electrical safety device in the event of a short circuit. The alarm "toggle switch" which is located on the top of the control panel may be used to optionally turn the alarm buzzer to the off position, if desired. It is recommended to leave this switch in the "on," or down position. Finally, the operator has the option of decreasing the unit's sensitivity by simple depressing, or "pushing in" the upper sensor probe. This will allow the lower sensor probe to contact the barometer needle at a lower given air pressure.

I claim:

1. An atmospheric low pressure alarm system comprising:
   a breadbox casing;
   a face plate fixedly mounted to the breadbox casing;
   a barometric scale printed to the face plate;
   a rotatable shaft extending through the face plate;
   a conductive scale pointer affixed to the rotatable shaft for a sweeping movement over the face plate;
   a means for the scale pointer to rotate about in a counter-clockwise direction as the atmospheric pressure decreases and in a clockwise direction as the atmospheric pressure rises;
   a first insulated pushbutton contact switch mounted to the barometric face plate and representing a first selectable alarm threshold position;
   a second insulated pushbutton contact switch mounted to the barometric face plate below the first pushbutton switch and representing a second selectable alarm threshold position;
   said first and second pushbutton contact switches each acting as a sensor when not being pushed down to a recessed position, which upon contact with the conductive scale pointer complete an electrical circuit to activate an alarm.

2. An atmospheric low pressure alarm system as in claim 1, further comprising:
   a first toggle switch mounted to the lower front of the breadbox casing for accessing battery power when in the downward position, and which utilizes a wall power supply when toggled in the upward position;
   a second toggle switch mounted to the upper front of the breadbox casing whereby an audio alarm is disabled when in the upward position, and whereby the audio alarm is enabled when in the downward position; and
   at least one fuse for protecting circuitry from unanticipated short circuit conditions.

* * * * *